United States Patent
Grajcar

(10) Patent No.: US 10,212,892 B2
(45) Date of Patent: Feb. 26, 2019

(54) LIGHT SOURCES ADAPTED TO SPECTRAL SENSITIVITY OF PLANT

(71) Applicant: Once Innovations, Inc., Plymouth, MN (US)

(72) Inventor: Zdenko Grajcar, Orono, MN (US)

(73) Assignee: Once Innovatians, Inc., Plymouth, MN (US)

(*) Notice: Subject to any disclaimer, the term of this patent is extended or adjusted under 35 U.S.C. 154(b) by 503 days.

(21) Appl. No.: 14/413,451

(22) PCT Filed: Jul. 9, 2013

(86) PCT No.: PCT/US2013/049708
§ 371 (c)(1),
(2) Date: Jan. 8, 2015

(87) PCT Pub. No.: WO2014/011623
PCT Pub. Date: Jan. 16, 2014

(65) Prior Publication Data
US 2015/0150195 A1    Jun. 4, 2015

Related U.S. Application Data

(60) Provisional application No. 61/669,825, filed on Jul. 10, 2012.

(51) Int. Cl.
*A01G 29/00* (2006.01)
*A01G 7/04* (2006.01)
*H05B 33/08* (2006.01)

(52) U.S. Cl.
CPC ......... *A01G 7/045* (2013.01); *H05B 33/0845* (2013.01); *Y02P 60/149* (2015.11)

(58) Field of Classification Search
CPC ..................................... A01G 7/045
See application file for complete search history.

(56) References Cited

U.S. PATENT DOCUMENTS

| 4,250,666 A | 2/1981 | Rakestraw |
| 4,441,145 A | 4/1984 | Antkowiak |

(Continued)

FOREIGN PATENT DOCUMENTS

| CN | 1400863 A | 3/2003 |
| CN | 101605413 A | 12/2009 |

(Continued)

OTHER PUBLICATIONS

"U.S. Appl. No. 14/689,117, Non Final Office Action dated Sep. 12, 2017", 9 pgs.

(Continued)

*Primary Examiner* — Kristen C Hayes
(74) *Attorney, Agent, or Firm* — Schwegman Lundberg & Woessner, P.A.

(57) ABSTRACT

A method of stimulating plant growth in a controlled environment that includes providing a lighting assembly having a network of lighting elements such as light emitting diodes (LEDs) that provide light at a color tailored for an individual plant. The lighting assembly is positioned adjacent a plant such that the light produced is received by the plant. The lighting assembly additionally has a control assembly that includes driving circuitry that modulates the lighting elements to controllably provide predetermined periods of light and dark to stimulate continuous growth of the plant.

12 Claims, 5 Drawing Sheets

(56) References Cited

U.S. PATENT DOCUMENTS

| | | | |
|---|---|---|---|
| 4,914,858 A | 4/1990 | Nijssen et al. | |
| 5,012,609 A * | 5/1991 | Ignatius | A01C 1/00 |
| | | | 47/1.01 R |
| 7,220,018 B2 | 5/2007 | Crabb et al. | |
| 8,302,346 B2 | 11/2012 | Hunt et al. | |
| 8,410,725 B2 * | 4/2013 | Jacobs | H05B 33/0803 |
| | | | 315/185 R |
| 8,545,915 B2 | 10/2013 | Schroeder | |
| 8,547,391 B2 | 10/2013 | Maxik et al. | |
| 8,552,942 B2 * | 10/2013 | Hua | H05B 33/0815 |
| | | | 345/77 |
| 8,568,009 B2 | 10/2013 | Chiang et al. | |
| 8,590,207 B1 | 11/2013 | Shih | |
| 8,643,276 B2 | 2/2014 | Maxik | |
| 8,656,636 B2 | 2/2014 | Hunt et al. | |
| 8,729,832 B2 | 5/2014 | Maxik et al. | |
| 8,738,160 B2 | 5/2014 | Bucove et al. | |
| 8,754,832 B2 | 6/2014 | Maxik et al. | |
| 8,760,370 B2 | 6/2014 | Maxik et al. | |
| 8,847,514 B1 * | 9/2014 | Reynoso | A01G 7/045 |
| | | | 315/307 |
| 8,850,742 B2 | 10/2014 | Dube | |
| 8,901,584 B2 | 12/2014 | Seo et al. | |
| 8,901,850 B2 | 12/2014 | Maxik et al. | |
| 2003/0004556 A1 | 1/2003 | Mcdaniel | |
| 2004/0065006 A1 | 4/2004 | Weder | |
| 2005/0125887 A1 | 6/2005 | Taylor | |
| 2005/0135104 A1 | 6/2005 | Crabb et al. | |
| 2006/0113927 A1 | 6/2006 | Bondy et al. | |
| 2007/0151149 A1 | 7/2007 | Karpinski | |
| 2009/0303706 A1 | 12/2009 | Atehortua | |
| 2010/0020536 A1 * | 1/2010 | Bafetti | F21V 23/003 |
| | | | 362/231 |
| 2010/0043287 A1 * | 2/2010 | Jones | A01G 7/045 |
| | | | 47/1.01 R |
| 2010/0244724 A1 * | 9/2010 | Jacobs | H05B 33/0803 |
| | | | 315/253 |
| 2011/0001766 A1 * | 1/2011 | Hua | H05B 33/0815 |
| | | | 345/690 |
| 2011/0101833 A1 | 5/2011 | Grajcar | |
| 2011/0109244 A1 | 5/2011 | Grajcar | |
| 2011/0179706 A1 | 7/2011 | Hunt et al. | |
| 2011/0183368 A1 | 7/2011 | Chapman et al. | |
| 2011/0193487 A1 | 8/2011 | Janik | |
| 2011/0209404 A1 | 9/2011 | Scott | |
| 2011/0210678 A1 * | 9/2011 | Grajcar | H05B 33/0809 |
| | | | 315/192 |
| 2011/0228515 A1 | 9/2011 | Grajcar | |
| 2011/0241559 A1 | 10/2011 | Grajcar | |
| 2011/0273098 A1 | 11/2011 | Grajcar | |
| 2012/0020071 A1 | 1/2012 | Mckenzie | |
| 2012/0075848 A1 * | 3/2012 | Yamada | A01G 7/045 |
| | | | 362/231 |
| 2012/0099305 A1 | 4/2012 | Bucove | |
| 2012/0104977 A1 | 5/2012 | Mckenzie et al. | |
| 2012/0170264 A1 | 7/2012 | Mckenzie et al. | |
| 2012/0192486 A1 | 8/2012 | Shanahan et al. | |
| 2012/0287617 A1 | 11/2012 | Mekhtarian | |
| 2012/0326610 A1 | 12/2012 | Lawyer et al. | |
| 2013/0003382 A1 | 1/2013 | Ohura et al. | |
| 2013/0006401 A1 | 1/2013 | Shan | |
| 2013/0139437 A1 | 6/2013 | Maxik et al. | |
| 2013/0172963 A1 | 7/2013 | Moffat | |
| 2013/0229114 A1 | 9/2013 | Eisele et al. | |
| 2013/0263503 A1 * | 10/2013 | Bostdorff | A01G 7/045 |
| | | | 47/58.1 LS |
| 2013/0264934 A1 | 10/2013 | Osaki et al. | |
| 2013/0278445 A1 | 10/2013 | Quell et al. | |
| 2013/0326941 A1 | 12/2013 | Pickett et al. | |
| 2014/0250778 A1 * | 9/2014 | Suntych | A01G 7/045 |
| | | | 47/1.4 |
| 2015/0128488 A1 | 5/2015 | Casper et al. | |
| 2015/0128489 A1 * | 5/2015 | Yamada | A01G 7/045 |
| | | | 47/58.1 LS |
| 2015/0216130 A1 * | 8/2015 | Grajcar | A01G 7/045 |
| | | | 47/58.1 LS |
| 2015/0273235 A1 | 10/2015 | Grajcar | |
| 2016/0113213 A1 * | 4/2016 | Berinsky | A01G 7/045 |
| | | | 47/58.1 LS |
| 2016/0192597 A1 | 7/2016 | Chang | |
| 2017/0071044 A1 * | 3/2017 | Aikala | H05B 33/0863 |

FOREIGN PATENT DOCUMENTS

| | | |
|---|---|---|
| CN | 101682953 A | 3/2010 |
| EP | 307991 A1 | 3/1989 |
| EP | 1626620 A1 | 2/2006 |
| EP | 2090154 A2 | 8/2009 |
| EP | 2181582 A1 | 5/2010 |
| EP | 2278870 A1 | 2/2011 |
| EP | 2556745 A1 | 2/2013 |
| EP | 2609362 A1 | 7/2013 |
| EP | 2785171 A1 | 10/2014 |
| GB | 2220551 A | 1/1990 |
| JP | 08242694 A | 9/1996 |
| JP | 2001128571 A | 5/2001 |
| JP | 20002199816 A | 7/2002 |
| JP | 2003009662 A | 1/2003 |
| JP | 2004113160 A | 4/2004 |
| JP | 2005295955 A | 10/2005 |
| JP | 2006262817 A | 10/2006 |
| JP | 2008242694 A | 10/2008 |
| JP | 4308891 B1 | 8/2009 |
| JP | 2009261267 A | 11/2009 |
| JP | 2011045286 A | 3/2011 |
| JP | 2011177127 A | 9/2011 |
| JP | 2011181484 A | 9/2011 |
| JP | 2013021981 A | 2/2013 |
| JP | 2014113145 A | 6/2014 |
| TW | 200621146 A | 7/2006 |
| WO | WO-1997030579 A1 | 8/1997 |
| WO | WO-2013041389 A1 | 3/2013 |
| WO | WO-2014011623 A2 | 1/2014 |
| WO | WO-2014011623 A3 | 1/2014 |
| WO | WO-2015148897 A1 | 10/2015 |
| WO | WO-2015161145 A1 | 10/2015 |

OTHER PUBLICATIONS

"Japanese Application Serial No. 2015-521740 Notice of Rejection dated Mar. 6, 2017", 4 pgs.

"International Application Serial No. PCT/US2013/049708, International Search Report dated Dec. 20, 2013", 2 pgs.

"International Application Serial No. PCT/US2013/049708, Written Opinion dated Dec. 20, 2013", 5 pgs.

"International Application Serial No. PCT/US2013/049708, International Preliminary Report on Patentability dated Jan. 22, 2015", 7 pgs.

"U.S. Appl. No. 14/689,117, Response filed Dec. 12, 2017 to Non Final Office Action dated Sep. 12, 2017", 9 pgs.

"Chinese Application Serial No. 201380041811, First Office Action dated Jan. 19, 2016", 10 pgs.

"Chinese Application Serial No. 201380041811, Notice of Rejection dated Sep. 12, 2017", 7 pgs.

"Chinese Application Serial No. 201380041811, Second Office Action dated Dec. 5, 2016", 14 pgs.

"European Application Serial No. 13816914, search report dated Nov. 22, 2016", 17 pgs.

"U.S. Appl. No. 14/670,653, Final Office Action dated Dec. 22, 2016", 10 pgs.

"U.S. Appl. No. 14/670,653, Non Final Office Action dated May 26, 2016", 13 pgs.

"U.S. Appl. No. 14/670,653, Response filed Oct. 26, 2016 to Non Final Office Action dated May 26, 2016", 10 pgs.

"International Application Serial No. PCT/US2015/022939, International Preliminary Report on Patentability dated Oct. 13, 2016", 9 pgs.

"International Application Serial No. PCT/US2015/026285, International Preliminary Report on Patentability dated Jul. 15, 2016", 7 pgs.

(56) References Cited

OTHER PUBLICATIONS

U.S. Appl. No. 14/670,653, filed Mar. 27, 2015, Devices and Method of Causing Chemical Reaction to Supplement Vitamin D Production.
U.S. Appl. No. 14/689,117, filed Apr. 17, 2015, Light Sources Adapted to Spectral Sensitivity of Plants.
"U.S. Appl. No. 14/689,117, Restriction Requirement dated Feb. 3, 2017", 7 pgs.
"U.S. Appl. No. 14/689,117, Response filed Aug. 3, 2017 to Restriction Requirement dated Feb. 3, 2017", 5 pgs.
"International Application Serial No. PCT/US2015/022939, International Search Report dated Jul. 9, 2015", 2 pgs.
"International Application Serial No. PCT/US2015/022939, Written Opinion dated Jul. 9, 2015", 7 pgs.
"International Application Serial No. PCT/US2015/026285, International Search Report dated Jul. 16, 2015", 2 pgs.
"International Application Serial No. PCT/US2015/026285, Written Opinion dated Jul. 16, 2015", 7 pgs.
Holick, M F, "Vitamin D: importance in the prevention of cancers, type 1 diabetes, heart disease, and osteoporosis", The American journal of clinical nutrition 79.3, (2004), 362-371.

\* cited by examiner

LIGHT SOURCES ADAPTED TO SPECTRAL SENSITIVITY OF PLANT

CLAIM OF PRIORITY

This application is a U.S. National Stage Filing under 35 U.S.C. 371 from International Patent Application Serial No. PCT/US2013/049708, filed Jul. 9, 2013, published on Jan. 16, 2014 as WO 2014/011623A2, which claims benefit to and is based upon U.S. Provisional Patent Application Ser. No. 61/669,825, filed on Jul. 10, 2012, which is hereby incorporated by reference in its entirety.

BACKGROUND

This invention relates to plant growth. More specifically this invention relates to a method and assembly of radiating plants to enhance photosynthesis.

It is well known in the art that during the photosynthesis process plants absorb different frequencies of light to cause photosynthesis to occur. In particular photosynthetically active radiation (PAR) is radiation in the spectral range from approximately 400 nanometers (nm) to 700 nm. Also known in the art is that chlorophyll, the most abundant plant pigment and the pigment responsible for plant metabolism is most efficient at capturing red and blue light.

During photosynthesis the chlorophyll pigments in a plant absorb photons in order to drive a metabolic process and dissipate other energy within the photons. Simultaneously other pigments that are red/farred and blue/UV-A and UV-B photosensors or photoreceptors chemically react to adjust the behavior and development of the plant. Thus, by providing red and blue spectrum light, plants have been shown to grow at increased rates.

In addition, also known in the art is that plants need turn over, or time in the dark. In particular, when a pigment has accepted a photon and is going through the metabolic process, the pigment cannot accept additional photons. Still, when additional photons bombard the plant the pigments will continue to attempt to metabolize thus straining or fatiguing the plant. Thus dark time is needed to allow the pigments to complete the metabolic process and to restart the process. Thus just as humans need sleep, plants similarly need down time to optimize the metabolic process. In particular, depending on the type of plant, a plant needs approximately 3.5 to 14.5 milliseconds (ms) of turn over time per every 24 ms in order to minimize the fatigue or strain caused by the light.

As a result of this phenomena, DC lighting that is controlled by pulse width modulation (PWM) has been utilized in order to enhance the growth characteristics in plants. By utilizing PWM lighting in bursts or flicker not detectable by the human eye those in the art have attempted to optimize photosynthesis.

Still, problems exist as a result of utilizing DC lighting. Specifically DC (direct current) lighting is expensive, can be unreliable and difficult to use. In addition, while research on these effects has been conducted, industry applicable products that are easy to use and meaningful are still desired. Thus, a need in the art exists for an AC (alternating current) lighting source that is robust, inexpensive to manufacture and operate and is able to enhance growth characteristics in plants.

Therefore, a principle object of the present invention is to enhance growth characteristics in plants utilizing an AC power source.

Another object of the present invention is to provide cost effective lighting that enhances plant growth.

Yet another object of the present invention is to provide a lighting assembly that is used for multiple plants.

Another object of the present invention is to provide alternative methods of modulating light provided to plants to use of a DC power source.

These and other objects, features and advantages will become apparent from the rest of the specification.

SUMMARY OF THE INVENTION

A horticultural assembly for the growth of plants, including flowers. The assembly includes AC powered light source assemblies adjacent plants and adapted to the spectral sensitivity of plants. A light engine assembly is provided that is dimmable and through phase cutting can stop current from going to LEDs in the assembly to provide periods where no light is being emitted by the assembly. Further the light engine assembly includes a chip element that provides both red and blue light emitting diodes (LEDs) in series such that through phase cutting red and blue light emissions can be controlled.

DETAILED DESCRIPTION OF A PREFERRED EMBODIMENT

Figure 1:
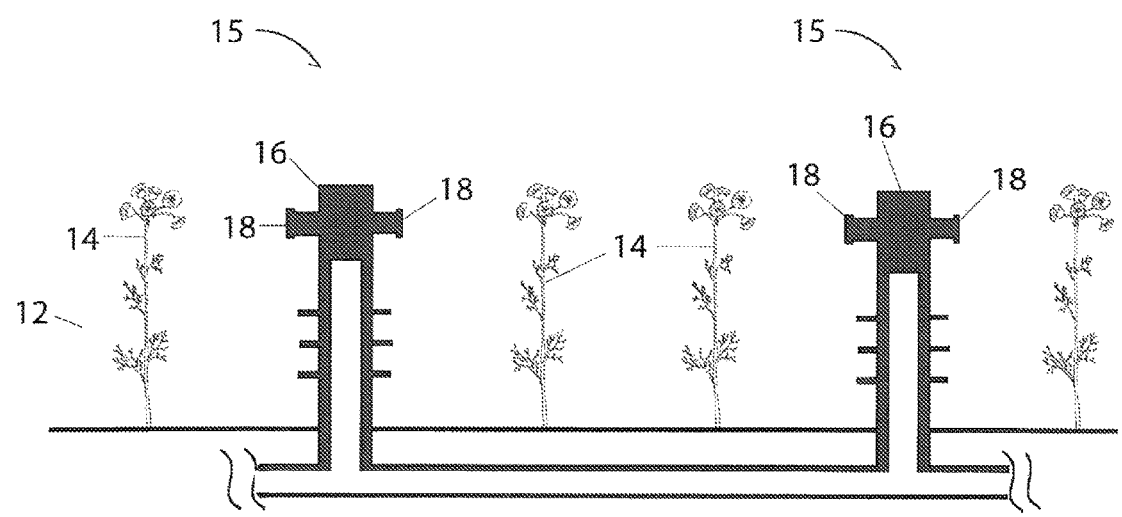
FIG. 1 is a side plan view of a lighting assembly in a controlled environment for growing plant life.

As shown in FIG. 1 a horticultural assembly 10 can be at any location, including outdoors, in a green house, indoors or the like. The assembly 10 includes a container or space 12 where plants 14 that are typically planted in side by side relation are located. While described as being planted in side by side relation, a single plant, or plurality of plants planted in any relation to one another is contemplated and does not fall outside of this disclosure. A water system 15 is also provided that preferably comprises a series of water conduits 16 that convey water to the plants 14 to assist in the growing process.

Positioned adjacent the plants are a plurality of light source assemblies 18 powered by an AC source. These assemblies 18 may be mounted or secured to the water conduits 16 of the water conduit system 14 or alternatively placed on a secondary conduit system or otherwise placed or mounted adjacent the plants 14 such that at least one plant receives radiation emitted by the assemblies 18.

Figure 2:
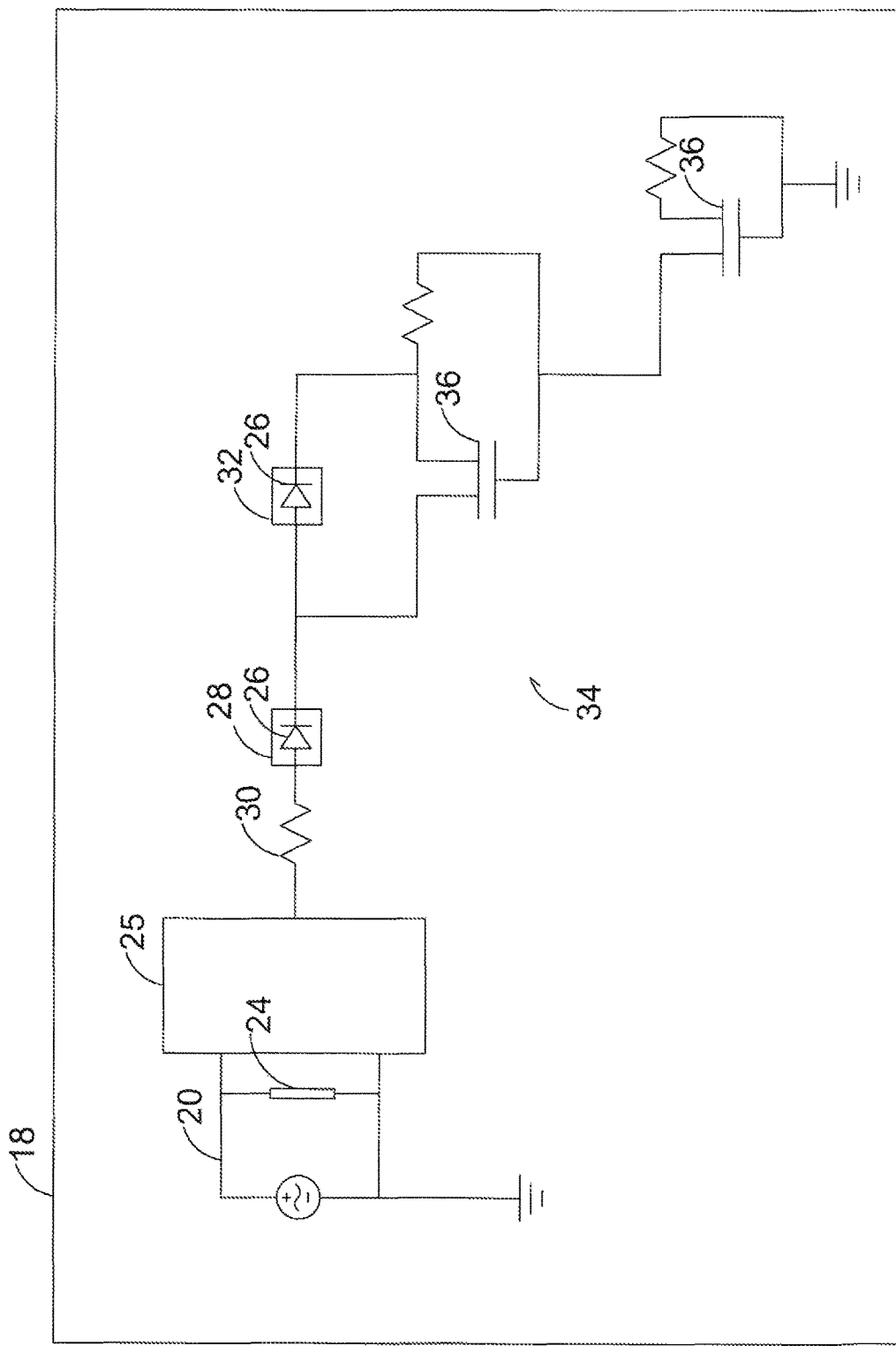
FIG. 2 is a schematic diagram of a lighting assembly for growing plant life.

The assemblies 18 are dimmable and are constructed as is described in U.S. patent application Ser. No. 12/824,215 to Grajcar and/or U.S. patent application Ser. No. 12/914,575 to Grajcar, both that are incorporated herein. One such assembly as an example only is shown in FIG. 2 having an pair of input terminals 20 that are adapted to receive a periodic excitation voltage such that the terminals can receive AC current or a current of equal magnitude and opposite polarity, said current flowing in response to the excitation voltage to provide an AC input. The AC current is then conditioned by driving circuitry 22 that optionally includes an metal oxide varesistor (MOV) 24 and a rectifying device 25 that in a preferred embodiment is a bridge rectifier formed of a plurality of light emitting diodes (LEDs) 26.

A plurality of lighting elements 27 such as light emitting diodes (LEDs) 26 are arranged in a first network 28 where the first network 28 is arranged to conduct the current in response to the excitation voltage exceeding at least a forward threshold voltage associated with the first network 28. Optionally depending on the driving circuitry 22 a resistor 30 or multiple resistors can be used to condition the current before reaching the first network 28. The LEDs 26 of the first network 28 can be of any type or color. In one embodiment the LEDs 26 of the first network 28 are red LEDs that produce light having a wavelength of approximately 600-750 nano meters (nm). In another embodiment the first network of LEDs are blue LEDs that produce light having a wavelength of approximately 350-500 nm. Alternatively both red and blue LEDs can be provided together or other colored LEDs such as green may similarly be used without falling outside the scope of this disclosure.

A second network 32 having lighting elements 27 such as a plurality of LEDs 26 is additionally provided in series relationship with the first network 28. The LEDs 26 of the second network 32 can be of any type or color. In one embodiment the LEDs 26 of the second network 32 are red LEDs that produce light having a wavelength of approximately 600-750 nano meters (nm). In another embodiment the second network of LEDs are blue LEDs that produce light having a wavelength of approximately 350-500 nm. Alternatively both red and blue LEDs can be provided together or other colored LEDs such as green may similarly be used without falling outside the scope of this disclosure.

A bypass path 34 is provided in the assembly 18 that is in series relationship with the first network 28 and in parallel relationship with the second network 32. Also within the bypass path 34 are elements that provide a controlled impedance, which can be, for example only a transistor 36 that in one embodiment is a depletion MOSFET. Additional transistors, resistors or the like can be used within the bypass path 34 all that condition current to provide the smooth and continuous transition from the bypass path 34 to the second network 32.

Accordingly, it is appreciated from the disclosure herein that color temperature shifting as a function of input excitation waveforms may be implemented or designed based on appropriate selection of LED groups or networks 28 and 32 and arrangement of one or more selective current diversion conditioning circuits to modulate a bypass current around selected LED networks 28 and 32. The selection of the number of diodes in each group, excitation voltage, phase control range, diode colors, and peak intensity parameters may be manipulated to yield improved electrical and/or light output performance for a range of lighting applications.

Figure 3:
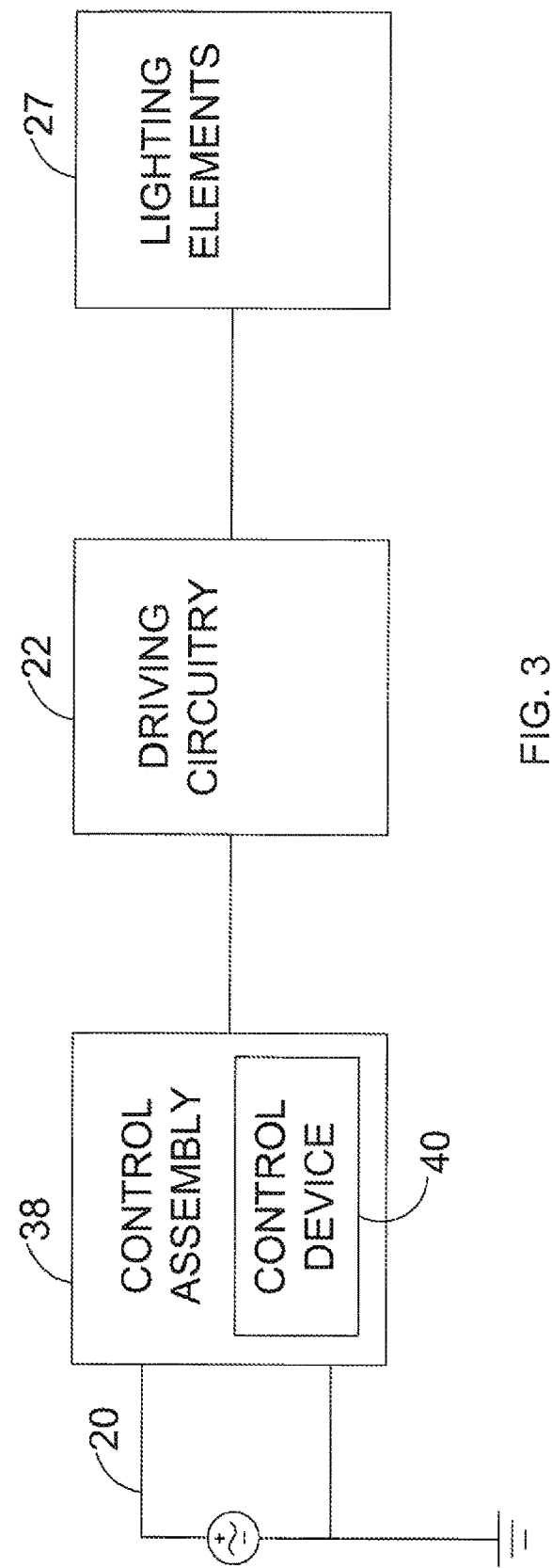
FIG. 3 is a schematic diagram of circuitry within a lighting assembly for growing plant life.
Figure 4A:
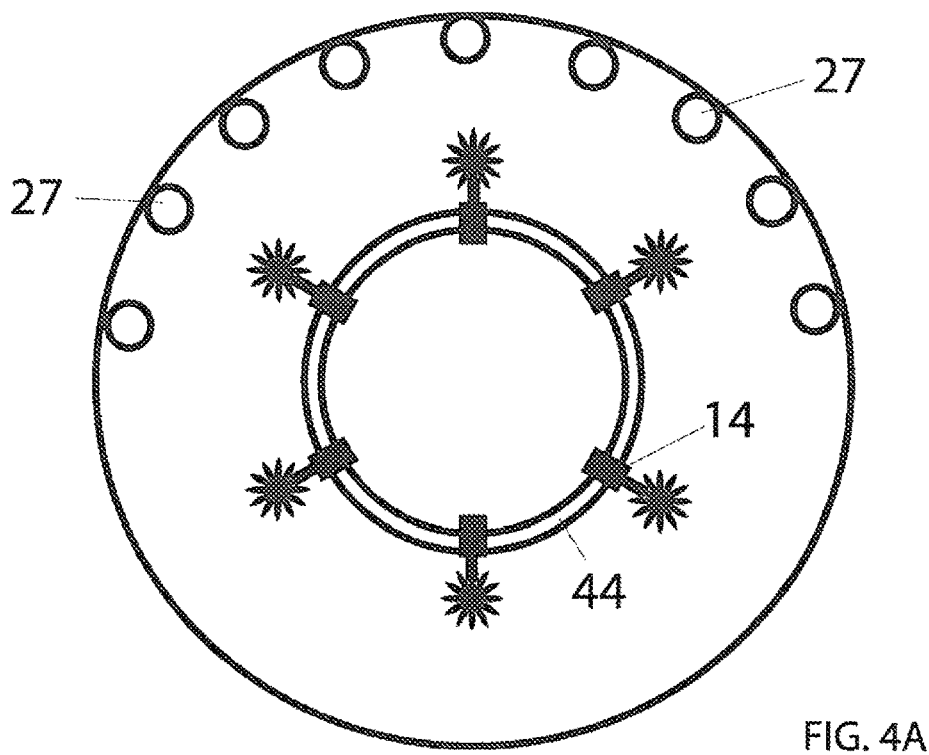
FIG. 4A is a side plan view of a cylindrical body for growing plant life.
Figure 4B:
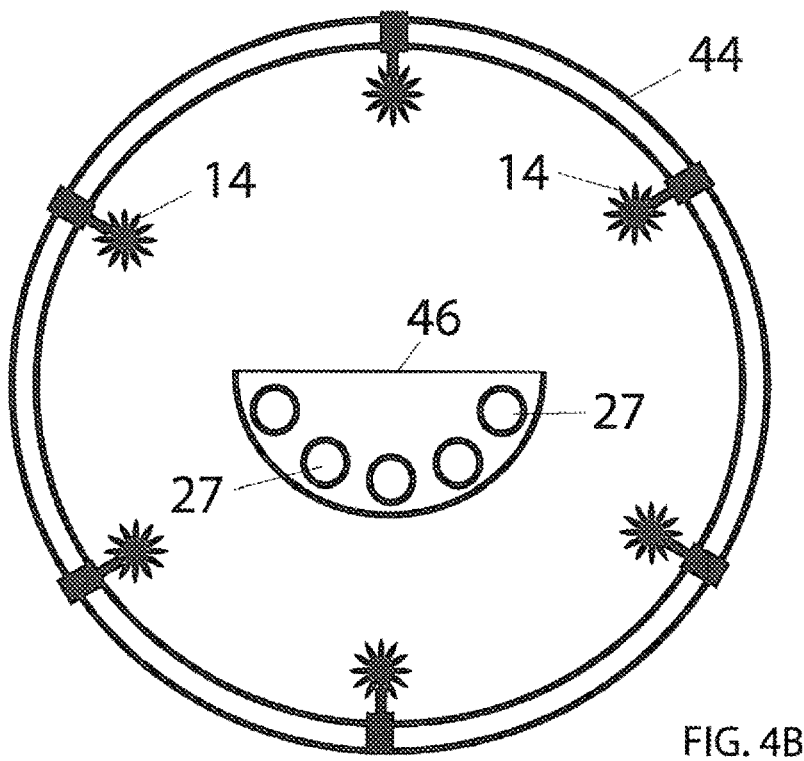
FIG. 4B is a side plan view of a cylindrical body for growing plant life.

FIGS. 3 and 4A and 4B show manners in which modulation of light is provided that does not require utilization of a DC power source. In one embodiment as shown in FIG. 3 a control assembly 38 is provided. The control assembly 38 can be a dimming device utilizing power leading edge and falling edge phase cutting elements. As an example only a triac dimmer presents phase cutting at a leading edge while a IGBT dimmer presents phase cutting at a trailing edge. In this embodiment the dimming device having both leading edge and trailing edge phase cutting is in electrical communication with the driving circuitry 22. In this manner by utilizing both in a control assembly 38 a predetermined period of no current is provided. Thus a control device 40 associated with the control assembly 38 can be used to determine the period of no current and thus period of dark.

In another embodiment the control assembly 38 includes at least one SCR silicon controlled rectifier) and in one embodiment first and second SCRs that are utilized to cut current provided for a predetermined period of time. The cut can occur at a 0 phase angle or alternatively at an angle. Thus, by utilizing SCRs, the control assembly 38 again functions as a controllable on/off switch of the lighting assemblies 18. Specifically, in one embodiment the control device 40, such as a control knob is in communication with first and second SCRs such that the predetermined period of light and dark can be set at any predetermined time period from 0-30 minutes.

In an alternative embodiment as provided in FIGS. 4A and 4B the modulation of light is not controlled electrically. In opposite either the lighting assemblies 18 themselves or the plants 14 move relative to one another to cause periods of light and dark to occur. In one embodiment a plurality of plants 14 are disposed within a rotating cylindrical body 44 that in one embodiment is a barrel with a plurality of lighting elements 27 arcuately surrounding the periphery 46 of the cylindrical body 44 adjacent the plants 14. In one embodiment approximately 180° of lighting elements 27 arcuately surround the cylindrical body. In another embodiment only 90° of lighting elements 27 are provided. In this manner the cylindrical body 44 can rotate, the lighting elements 27 can rotate or both can rotate to create periods of light and dark. In particular the lighting elements can have a low diffusion rate thus providing only direct light ensuring a dark period occurs. Therefore, the length of the periods of light and dark can be controlled by the relative rotational speed between the lighting elements 27 and plants 14 in the cylindrical body 44. Alternatively a shield 46 can be presented to block light again causing dark periods to occur.

Figure 5:
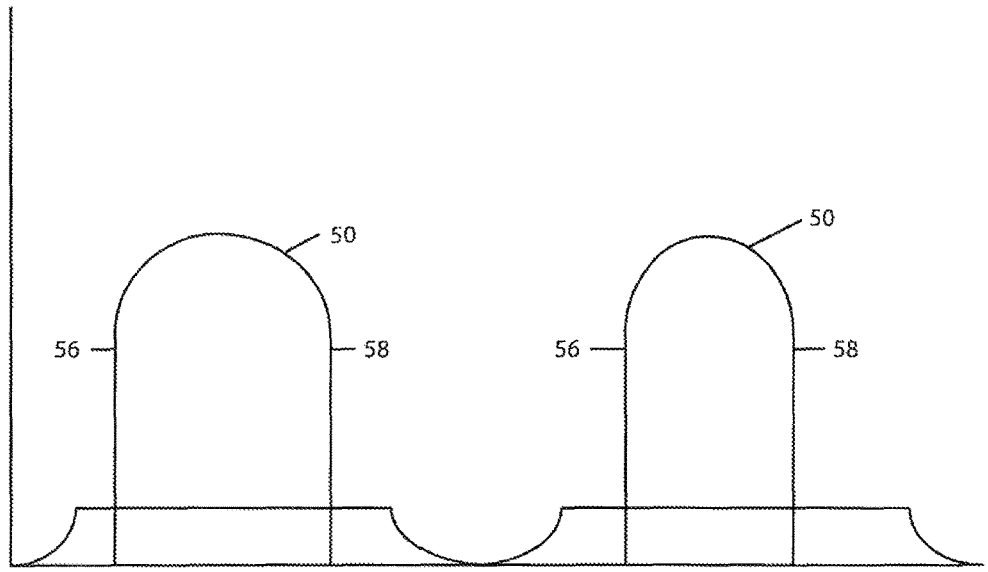
FIG. 5 is a graph showing voltage and current over a period of time for a lighting assembly for growing plant life.
Figure 6:
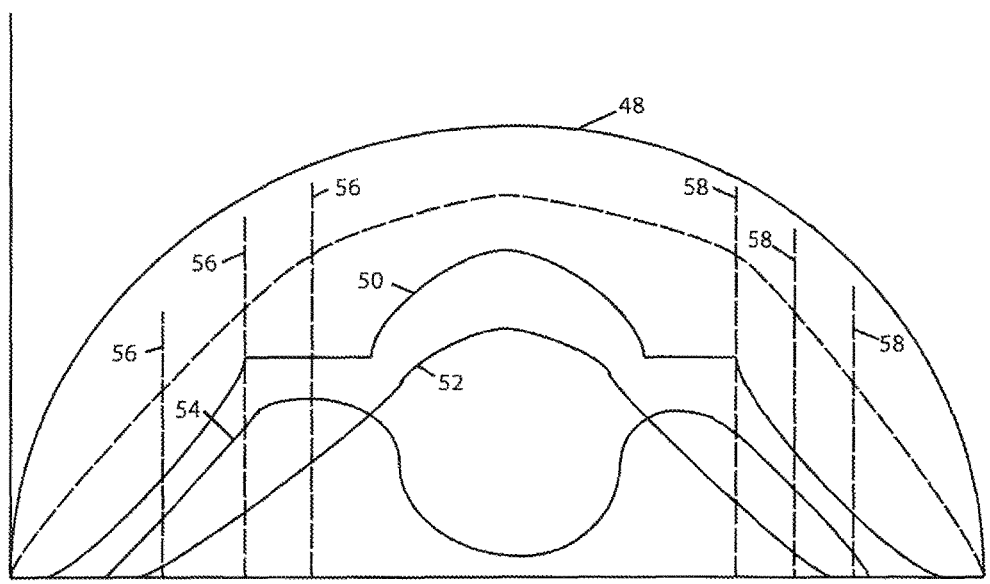
FIG. 6 is a graph showing voltage and current over a period of time for a lighting assembly for growing plant life.

FIGS. 5 and 6 show graphs of voltage and current in a possible embodiment utilizing red and blue lighting elements 27 and a control assembly 38 for controlling modulation of light. In this embodiment the driving circuitry 22 in response to the input voltage 48 conditions the overall current 50. In this manner blue lighting element current 52 steadily increases then decreases while red lighting element current 54 increases, then decreases before again increasing. Depending on the requirements of a user the current 50 can optionally be cut at a leading edge 56 and trailing edge 58 as desired to reduce current to zero and create a period of darkness as discussed in detail above. Therefore, depending on the driving circuitry 22 and choice of lighting elements 27 as used in association with the lighting elements 27 the color output of the lighting assembly 18 is controllable so that once the optimum lighting for a given plant is determined, the assembly 18 can be controlled to provide this optimum result. In this manner both the optimum spectrum and modulation of light can be provided.

In operation, one can study and determine the predetermined light and dark period for a specific plant, along with predetermined light wavelengths or colors for a plant that optimizes a characteristic of the plant, such as growth, yield or the like. Then a lighting assembly 18 is manufactured to present the predetermined light wavelength and the control assembly 38 can be adjusted to provide the optimum predetermined light and dark periods for optimum growth.

The light assemblies 18 are constructed to present a phase of a predetermined time duration depending on the modulation of the conditioned current provided to the lighting elements 27. In a preferred embodiment the phase is 24 ms. During this phase as a result of phase cutting, whether leading edge by a triac or other component and/or falling edge by a transistor such as a IGBT or the like, current is not supplied to LEDs for a predetermined amount of time or period, preferably between 3.5 to 14.5 ms during each 24 ms phase to create a dark or turnover period for 3.5 to 14.5 ms. During this 3.5 to 14.5 ms the plants 14 experience turnover time in order to optimize the photosynthesis process. Specifically thus provided are predetermined periods of light and dark that stimulate continuous growth of the plant. When used in the context of this application, predetermined periods of light and dark are measured or determined by what can be perceived by a plant 14 and represents periods when no light is being emitting by the lighting elements 27, even if the light or dark cannot be perceived by a human. Thus, flicker and unperceivable flicker present that is not perceived by humans is considered to provide a predetermined period of light and dark within the context of this disclosure.

In the embodiment where first and second SCRs are utilized the SCRs function as a controllable on/off switch of the lighting assemblies 18. Such functioning allows for a predetermined period of light and a predetermined period of dark. In one embodiment the predetermined period for both the light and dark is approximately 30 minutes. Specifically the control assembly 38 is in communication with the first and second SCRs such that the predetermined period of light and dark can be set at any predetermined time period from 0-30 minutes. In this manner one can control the predetermined durations of light and dark to match the optimum requirements of specific plants.

Thus presented is a method and assembly 10 for illuminating a plurality of plants 14. The assembly 10 includes an AC powered light assembly 18 that through phase cutting provides a lighting cycle or phase that includes a predetermined amount of dark or turnover time for the plant. As a result the plant 14 gets the needed rest to relieve plant stress and strain during the completion of the metabolizing process. At this point the plant 14 is then ready to absorb more light to continue metabolizing in the photosynthesis process.

Meanwhile, by having red and blue diodes the effectiveness of the metabolizing and photosynthesis is maximized. Specifically red LEDs and blue LEDs can comprise the different networks 28 and 32 of LEDs to create intermittent blue light and red light in order to optimize the light received by the plants 14 according to the ideal PAR for that particular plant 14. As a result, not only can you have a 24 hour constant light growing cycle, but in addition the growth of the plant in maximized. The result is faster maturation and larger yield for the plats.

In addition, the control assembly 38 allows an individual to control the modulation of light for specific plants 14. Thus, if the optimum growing condition is to provide a period of 3.5 ms of light and 3.5 ms of dark, the control assembly 38 can be adjusted to provide this modulation. If a period of 30 minutes instead is required for maximum plant growth and enhancement of photosynthesis, the control device 42 can be adjusted and the assembly 18 can provide the modulation required. In this manner the assembly 18 can be used for numerous varieties of plants 14 without the need for a different assembly to be manufactured, thus improving on the state of the art.

In addition the lighting assemblies are easily manufactured and incorporated into new and existing horticulture assemblies by mounting or attaching them to water conduits 16 or mounting them otherwise adjacent to the plants 14. Finally, because current is conditioned from an AC input is utilized and pulse width modulation eliminated, the cost associated with the lighting assembly 18 is greatly reduced. Thus, at the very least all of the stated objects have been met.

What is claimed is:

1. A method of stimulating plant growth in a controlled environment steps comprising:
   providing a pair of input terminals that are adapted to receive a periodic excitation voltage such that the terminals receive a current of equal magnitude and opposite polarity, said current flowing in response to the excitation voltage to provide an AC input;
   providing a lighting assembly that has driving circuitry that receives the AC input and conditions the current;
   providing a network of lighting elements that produce light at a predetermined wavelength n response to the conditioned current;
   positioning the lighting assembly adjacent a plant such that the light produced is received by the plant; and
   modulating the conditioned current of the lighting elements with a control assembly to controllably provide predetermined periods of light and dark to stimulate continuous growth of the plant;
   wherein the predetermined periods of light are in a range between 3.5 ms and 24 ms and the predetermined periods of dark are in a range between 3.5 ins and 24 ms.

2. The method of claim 1 wherein the network of lighting elements are light emitting diodes (LEDs).

3. The method of claim 2 wherein the predetermined wavelength of the network is in a range including and between 350 nm to 500 nm.

4. The method of claim 3 wherein the lighting assembly has a second network of lighting elements that produce light at a predetermined wavelength that are LEDs in series with the network of lighting elements.

5. The method of claim 4 wherein the predetermined wavelength of the second network of lighting elements is in a range between 600-750 nm.

6. The method of claim 2 wherein the predetermined wavelength of the network is in a range including and between 600 nm and 750 nm.

7. The method of claim 1 wherein the control assembly comprises a dimming device electrically connected to driving circuitry that conditions current from an AC input.

8. The method of claim 7 wherein the driving circuitry includes at least one silicon controlled rectifier (SCR).

9. The method of claim 8 further comprising the step of phase cutting current flowing to the LEDs with the at least one SCR to controllably determine the duration of the predetermined periods of light and dark.

10. The method of claim 9 wherein the dimming device has a triac therein.

11. The method of claim 9 wherein the dimming device has a IGBT therein.

12. The method of claim 1 wherein the predetermined periods of light are in a range between 3.5 ms and 14.5 ms and the predetermined periods of dark are in a range between 3.5 ms and 14.5 ms.

* * * * *